(12) United States Patent
Chapman et al.

(10) Patent No.: US 6,830,386 B1
(45) Date of Patent: Dec. 14, 2004

(54) OPTICAL TRANSMISSION LINE AND METHOD OF MANUFACTURE

(75) Inventors: Thomas R. Chapman, Painted Post, NY (US); Richard E. Rebis, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/833,877

(22) Filed: Apr. 28, 2004

(51) Int. Cl.[7] .............................................. G02B 6/255
(52) U.S. Cl. ........................... 385/96; 385/95; 385/97; 385/98; 385/123
(58) Field of Search ........................... 385/27, 28, 123, 385/95, 96, 97, 98

(56) References Cited

U.S. PATENT DOCUMENTS

| | | | |
|---|---|---|---|
| 6,321,006 B2 | 11/2001 | Wu | 385/28 |
| 6,336,749 B1 | 1/2002 | O'Toole et al. | 385/96 |
| 6,550,985 B2 | 4/2003 | Nakamura et al. | 385/96 |
| 6,666,591 B2 * | 12/2003 | Sasaoka et al. | 385/95 |
| 6,705,771 B2 * | 3/2004 | Jiang et al. | 385/96 |
| 2001/0022879 A1 * | 9/2001 | Wu | 385/28 |
| 2002/0048437 A1 | 4/2002 | Nakamura et al. | 385/96 |
| 2002/0114594 A1 | 8/2002 | Kato et al. | 385/96 |
| 2002/0146221 A1 | 10/2002 | Iwata et al. | 385/96 |
| 2002/0197027 A1 | 12/2002 | Saito et al. | 385/96 |
| 2002/0197028 A1 | 12/2002 | Suzuki et al. | 385/96 |
| 2003/0021553 A1 | 1/2003 | Suzuki | 385/96 |
| 2003/0031432 A1 | 2/2003 | Sykora et al. | 385/96 |
| 2004/0005126 A1 | 1/2004 | Yablon | 385/95 |
| 2004/0114886 A1 * | 6/2004 | Christensen et al. | 385/96 |

* cited by examiner

*Primary Examiner*—Brian M. Healy
(74) *Attorney, Agent, or Firm*—Joseph M. Homa

(57) ABSTRACT

A low splice loss optical fiber transmission line is disclosed which has a first optical fiber portion and a second optical fiber portion, the first and second optical fiber portions having different mode field diameters. The optical fiber transmission line is advantageously loss-flattened. Additionally, a method of making an optical fiber transmission line is disclosed such that the loss due to the spliced connection is reduced during the fabrication of the optical transmission line.

19 Claims, 4 Drawing Sheets

OPTICAL TRANSMISSION LINE AND METHOD OF MANUFACTURE

BACKGROUND OF THE INVENTION

1. Field of the Invention

The present invention relates to optical transmission lines formed from optical fibers of differing mode fields. More preferably, the present invention relates to optical transmission lines having reduced splice loss.

2. Technical Background

Thermal expansion of an optical fiber mode field or "core" to reduce splice loss or connector loss is known. For example, see: Hanafusa, H. and Horiguchi, M. "Thermally-Diffused Expanded Core Fibres for Low-Loss and Inexpensive Photonic Components," Electronics Letters, Vol. 27, No. 21 (10th October 1991); Shiraishi, K. et al., "Beam Expanding Fiber using Thermal Diffusion of the Dopant," Journal of Lightwave Technology, Vol. 8, No. 8, pp. 1151–1161, 1990; Knudsen, S. et al., "New Dispersion Slope Managed Fiber Pairs for Undersea Fiber Optic Transmission Systems, 2001 SubOptics 2001 Conference T4.2.2; European Patent Application No. 1094346; and U.S. Patent Publication No. 2002/0159723.

Dispersion compensation or dispersion management has been used to control or compensate for chromatic dispersion, and/or dispersion slope, of an optical transmission line comprising optical fibers. Higher performance optical networks require a large number of splices between dispersion-managed optical fibers, such that the losses incurred because of optical fiber splices can become appreciable. Reducing the splice loss of optical fibers having dissimilar mode fields has been particularly difficult.

As the capabilities of optical communication systems expand, the reduction of splice loss at not only at a single wavelength but across a wavelength range, or ranges, becomes increasingly important. For example, in a long haul transmission line comprising a plurality of amplifiers such as erbium doped fiber amplifiers, losses that vary with wavelength get amplified by the series of amplifiers.

The connecting of two optical fibers by fusion splicing typically begins with removing the coating on each optical fiber at the respective adjacent ends, then the adjacent end faces of the two optical fibers are butted together, and the end faces are softened and fusion-spliced by heating with an arc discharge or the like.

SUMMARY OF THE INVENTION

Disclosed herein is an optical fiber transmission line comprising a first optical fiber portion fused to a second optical fiber portion at a splice region, the first optical fiber portion having a first MFD at 1550 nm and the second optical fiber portion having a second MFD at 1550 nm, the first MFD differing from the second MFD, wherein the splice region has a splice loss less than 0.15 dB for all wavelengths between 1530 and 1570 nm. Thus, the optical fiber transmission line is loss-flattened. In preferred embodiments, the first MFD differs from the second MFD by more than 2 μm at 1550 rum. In preferred embodiments, the first optical fiber portion has positive dispersion at 1550 nm, and the second optical fiber portion has negative dispersion at 1550 rum. In other preferred embodiments, the first optical fiber portion has positive dispersion from 1530 to 1570 run, and the second optical fiber portion has negative dispersion from 1530 to 1570 nm.

Also disclosed herein is a method of making an optical fiber transmission line such that the loss due to the spliced connection is reduced during the fabrication of the optical transmission line. In one preferred embodiment, the method comprises the steps of: (a) fusing a first optical fiber to a second optical fiber to form the optical fiber transmission line comprising first and second optical fiber portions joined at a fusion splice; (b) heating the optical fiber transmission line after step (a) with a flame directed at the fusion splice sufficient to grow the mode field of the first optical fiber portion and the second optical fiber portion at or near the fusion splice, wherein both the first and second optical fiber portions are heated substantially symmetrically about the fusion splice; and (c) offset heating the optical fiber transmission line after step (b) with a flame directed asymmetrically about the fusion splice, wherein the offset heating is sufficient to provide a splice loss less than 0.15 dB for all wavelengths between 1530 and 1570 nm.

Reference will now be made in detail to the present preferred embodiments of the invention, examples of which are illustrated in the accompanying drawings.

DETAILED DESCRIPTION OF THE PREFERRED EMBODIMENT

Figure 1:
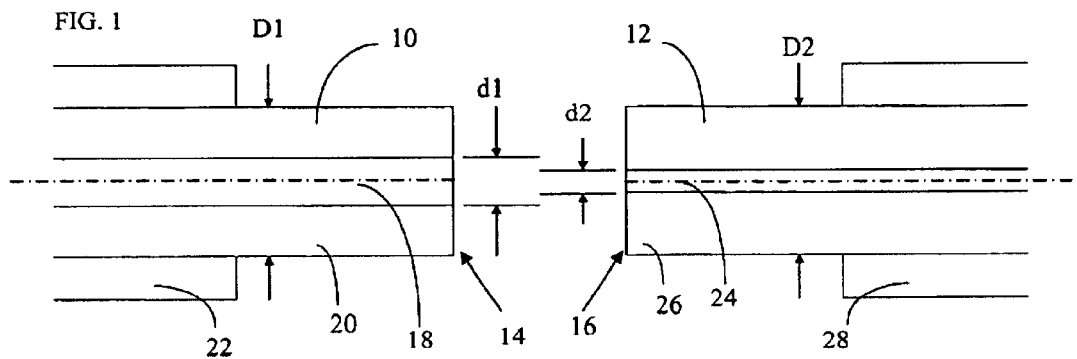
FIG. 1 is a schematic illustration of a first optical fiber and a second optical fiber with ends stripped of coating and being brought together in axial alignrrnent.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where ni is the maximum refractive index in region i, unless otherwise specified, and $n_c$ is the average refractive index of the cladding region. As used herein, the relative refractive index is represented by A and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff}=2\pi(\int f^2 r\, dr)^2/(\int f^4 r\, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The mode field diameter (MFD) is measured using the Peterman II method wherein, 2w=MFD, and $w^2=(2\int f^2 r\, dr/\int [df/dr]^2\, r\, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

An optical fiber line as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$.

FIG. 1 schematically illustrates a first optical fiber 10 and a second optical fiber 12, wherein the end 14 of the first optical fiber 10 and the end 16 of the second optical fiber 12 being brought together in axial alignment. The first optical fiber 10 comprises a core 18 directly adjacent to and surrounded by a cladding layer 20, the cladding layer 20 adjacent to and surrounded by one or more coating layers 22, and the second optical fiber 12 comprises a core 24 directly adjacent to and surrounded by a cladding layer 26, the cladding layer 26 adjacent to and surrounded by one or more coating layers 28. Preferably, the first optical fiber 10 and the second optical fiber 12 have respective outermost claddings 20, 26 with substantially similar outermost diameters $D_1$, $D_2$. The first optical fiber 10 has a first MFD (which may or may not coincide with its core diameter $D_1$) and the second optical fiber 12 has a second MFD (which may or may not coincide with its core diameter $D_2$), wherein the first MFD is greater than the second MFD. The respective ends 14, 16 of the first and second optical fibers 10, 12 are directly abutted and fusion spliced together.

Preferably, the cladding 20, 26 contains no germania or fluorine dopants therein. More preferably, the cladding is pure or substantially pure silica. However, the clad layer may include one or more dopants. The clad layer may be comprised of a cladding material which was deposited, for example during a laydown process, or which was provided in the form of a jacketing, such as a tube in a rod-in-tube optical preform arrangement, or a combination of deposited material and a jacket. The clad layer is preferably surrounded by a primary coating P and a secondary coating S in both coating 22 and 28. The refractive index of the cladding is used to calculate the relative refractive index percentage as discussed elsewhere herein. The clad layer preferably has a refractive index of $n_c$ surrounding the core which is defined to have a $\Delta(r)=0\%$, which is used to calculate the refractive index percentage of the various portions or regions of an optical fiber. FIG. 1 shows the coating layers 22, 28 stripped from the respective ends 14, 16 of the fibers 10, 12.

Figure 2:
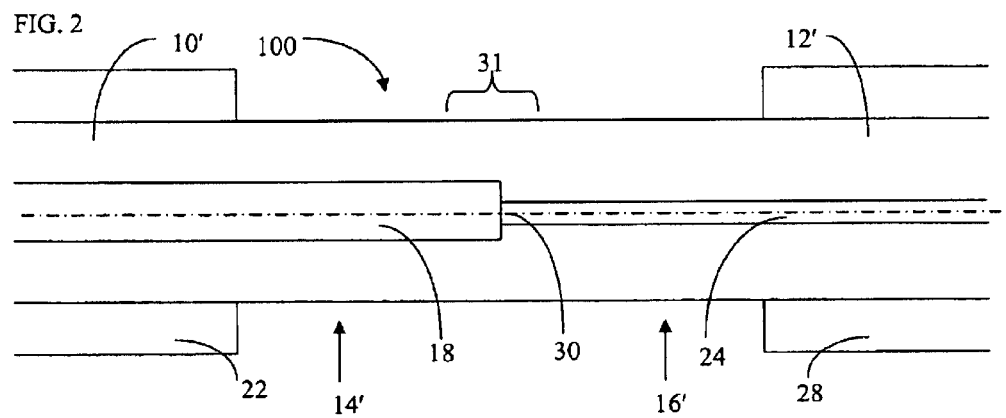
FIG. 2 is a schematic illustration of the first and second optical fibers of FIG. 1 after being fused together into a unitary fiber or optical fiber transmission line.

FIG. 2 schematically illustrates the resulting unitary fiber or optical fiber transmission line 100 formed from fusing together the ends 14, 16 of the first and second optical fibers 10, 12. The optical fiber transmission line 100 comprises a first optical fiber portion 10', formed from the first optical fiber 10, and a second optical fiber portion 12', formed from the second optical fiber 12. The line 100 comprises a fusion splice 30 at the juncture between the ends 14', 16' of the first and second optical fiber portions 10', 12'. Preferably, the first optical fiber portion 10', the second optical fiber portion 12', and the splice region 31 have respective substantially similar outermost diameters.

Figure 3:
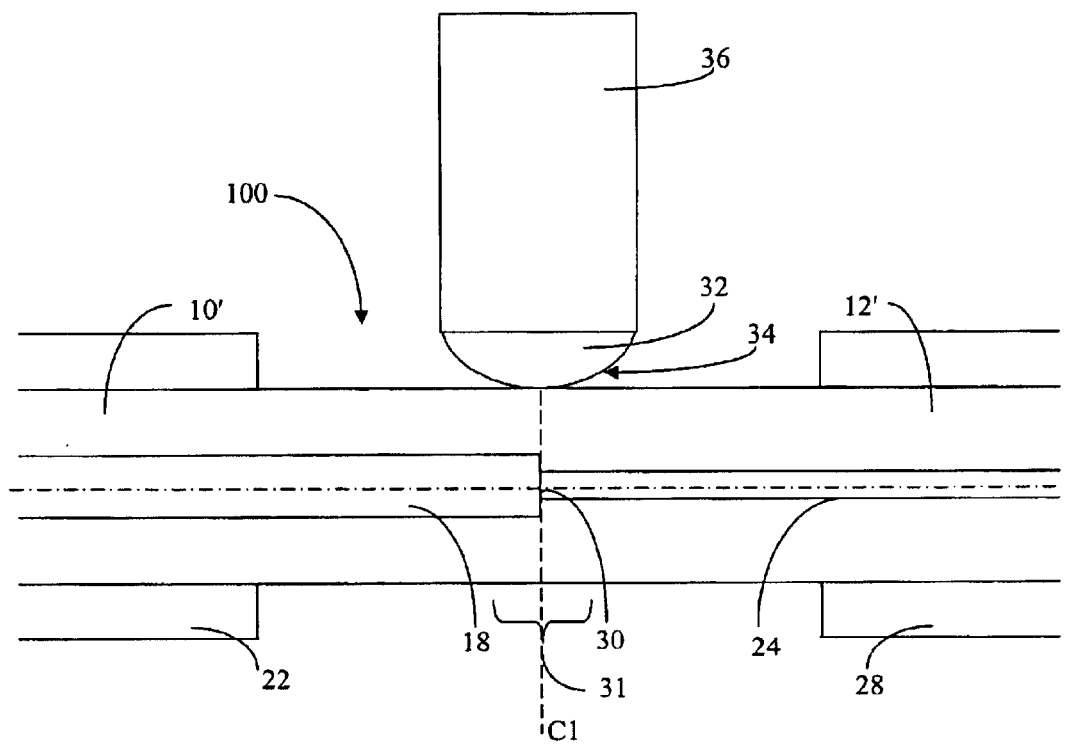
FIG. 3 is a schematic illustration of flame treatment of the optical fiber transmission line of FIG. 2.

FIG. 3 schematically illustrates heating the optical fiber transmission line with a flame 32 from a burner 36. The flame 32 is directed at the fusion splice 30, centered at a first center-position C1. Preferably, at least part of the flame 32 contacts the optical fiber transmission line 100 at the fusion splice 30. In preferred embodiments, the edge 34 of the visible flame 32 is positioned tangent with the optical fiber transmission line 100. Preferably, the flame 32 is disposed substantially symmetrically, more preferably symmetrically, about the fusion splice joint 30. Preferably the flame 32 is directed vertically downward (in line with the force of gravity) to minimize the introduction of flame-induced or heat-induced currents and forces upon the optical fiber line 100 and to more evenly distribute the tip of the flame 32 for exposing the fusion splice region 31 to more uniformly distributed heating temperatures. Both the first and second optical fiber portions 10', 12' are flame heated for a time and at a temperature sufficient to grow the mode field of the first and second optical fiber portions at or near the fusion splice 30.

Figure 4:
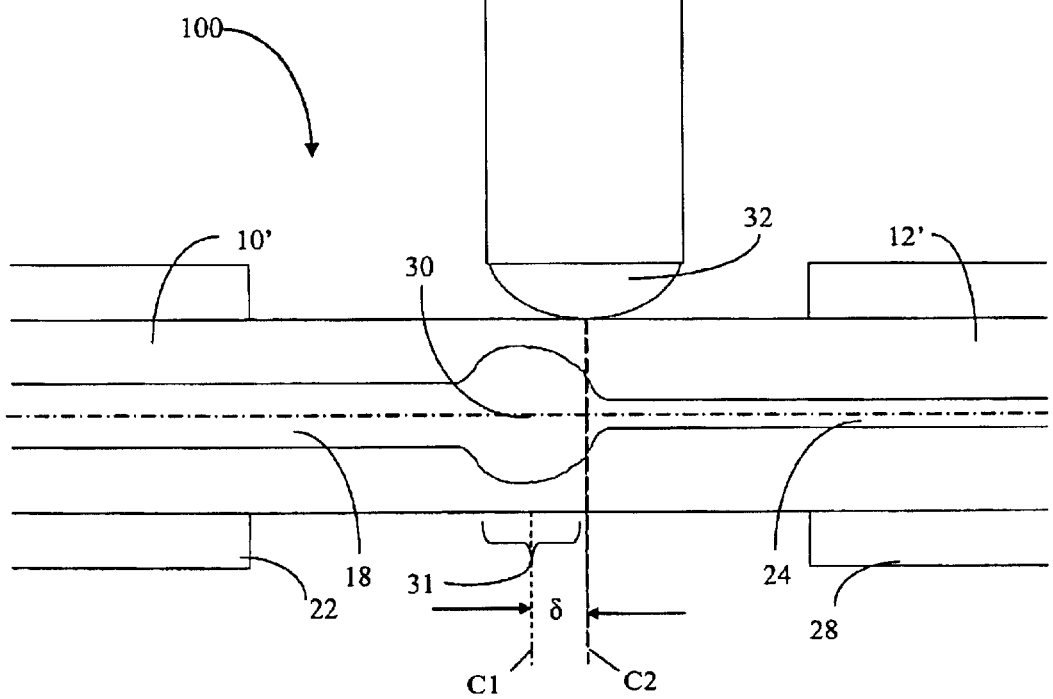
FIG. 4 is a schematic illustration of offset flame treatment of the optical fiber transmission line of FIG. 3.

FIG. 4 schematically illustrates the optical fiber transmission line 100 with a fusion splice region 31 having a grown first MFD and a grown second MFD, wherein the burner 36 and its flame 32 have been longitudinally offset from the first center-position C1 to a second center-position C2 on the optical fiber transmission line 100 such that the flame 32 is longitudinally displaced from the initial fusion splice 30 by an offset distance δ. The optical fiber transmission line 100 is offset heated with the flame 32 directed asymmetrically about the fusion splice 30. Preferably, the flame 32 used to heat the fusion splice symmetrically is the same flame that heats the optical fiber transmission line 100 asymmetrically about the fusion splice, wherein the relative positions of the flame and the line are adjusted with respect to one another. It is preferred to minimize moving or touching the optical fiber transmission line 100 around the spliced region 31, and therefore preferably the same flame is used symmetrically and asymmetrically, wherein that flame is moved relative to the fiber, or two flames are used, such that fiber need not be move, thereby reducing the exposure of the fiber to unwanted forces and/or contamination. Preferably both the first and second optical fiber portions 10', 12' are heated, but in any case the second optical fiber portion 12' is preferentially heated. Preferably, the flame 32 contacts the second optical fiber portion 12'. In some preferred embodiments, the flame 32 contacts the first optical fiber portion 10' and the second optical fiber portion 12'. Offset flame heating is carried out for a time and a temperature sufficient to provide a splice loss less than 0.15 dB, preferably less than 0.10 dB, more preferably less than 0.07 dB, even more preferably less than 0.05 dB, and still more preferably less than 0.03 dB, for all wavelengths between 1530 and 1570 nm.

Figure 5:
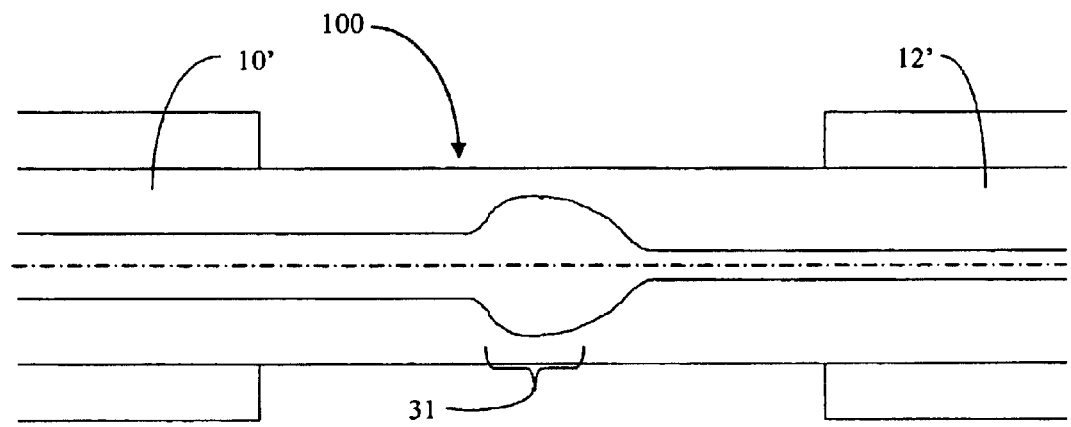
FIG. 5 is a schematic illustration of the optical fiber transmission line of FIG. 4 after all flame heating.

FIG. 5 schematically illustrates the resulting optical fiber transmission line 100 after all flame heating, the optical fiber transmission line comprising a first optical fiber portion 10' fused to a second optical fiber portion 12' at a splice region 31. One or more coatings are then preferably applied to the exposed silica between the ends of coatings 22 and 28 to cover the stripped areas.

Disclosed herein is an optical fiber transmission line 100 comprising a first optical fiber portion 10' fused to a second optical fiber portion 12' at a splice region 31, the first optical fiber portion 10' having a first MFD at 1550 nm and the second optical fiber portion 12' having a second MFD at 1550 nrm, the first MFD differing from the second MFD, wherein the splice region 31 has a splice loss less than 0.15 dB, preferably less than 0.10 dB, more preferably less than 0.07 dB, even more preferably less than 0.05 dB, and still more preferably less than 0.03 dB, for all wavelengths between 1530 and 1570 nm. An end 14 of the first optical fiber portion 10' is fused directly to an end 16 of the second optical fiber portion 12'. Preferably, the splice loss varies by less than 0.05 dB, more preferably by less than 0.02 dB, between 1530 and 1570 nm. In preferred embodiments, the splice loss varies by less than 0.05 dB, more preferably by less than 0.02 dB, for all wavelengths between 1520 and 1590 nm. In other preferred embodiments, the splice loss varies by less than 0.05 dB, more preferably by less than 0.02 dB, for all wavelengths between 1470 and 1620 nm. Thus, the optical fiber transmission line is loss-flattened.

In preferred embodiments, the splice loss is less than 0.15 dB, preferably less than 0.10 dB, and more preferably less than 0.07 dB, for all wavelengths between 1520 and 1590 nm.

In other preferred embodiments, the splice loss is less than 0.15 dB, preferably less than 0.10 dB, and more preferably less than 0.07 dB, even more preferably less than 0.05 dB, and still more preferably less than 0.03 dB, for all wavelengths between 1470 and 1620 mm.

In preferred embodiments, the first-MFD is greater than 8 pin at 1550 nm. In other preferred embodiments, the first MFD is greater than 9 $\mu$m at 1550 nm. In still other preferred embodiments, the first MFD is greater than 10 $\mu$m at 1550 nm.

In preferred embodiments, the second MFD is less than 8 $\mu$m at 1550 nm. In other preferred embodiments, the second MFD is less than 7 $\mu$m at 1550 nm. In still other preferred embodiments, the second MED is less than 6 $\mu$m at 1550 nm.

In preferred embodiments, the first MFD differs from the second MFD by more than 2 $\mu$m at 1550 nm. In other preferred embodiments, the first MFD differs from the second MFD by more than 3 $\mu$m at 1550 nm. In still other preferred embodiments, the first MFD differs from the second MFD by more than 4 $\mu$m at 1550 nm.

In preferred embodiments, the first optical fiber portion 10' has a first optical effective area greater than 80 $\mu m^2$ at 1550 nm. In other preferred embodiments, the first optical fiber portion 10' has a first optical effective area greater than 85 $\mu m^2$ at 1550 nm. In still other preferred embodiments, the first optical fiber portion 10' has a first optical effective area greater than 90 $\mu m^2$ at 1550 nm. In yet other preferred embodiments, the first optical fiber portion 10' has a first optical effective area greater than 95 $\mu m^2$ at 1550 nm.

In preferred embodiments, the second optical fiber portion 12' has a second optical effective area less than 40 $\mu m^2$ at 1550 nm. In other preferred embodiments, the second optical fiber portion has a second optical effective area less than 40 $\mu m^2$ at 1550 nm and greater than 25 $\mu m^2$ at 1550 nm. In still other preferred embodiments, the second optical fiber portion has a second optical effective area less than 40 $\mu m^2$ at 1550 nm and greater than 30 $\mu m^2$ at 1550 nm. In yet other preferred embodiments, the second optical fiber portion has a second optical effective area between about 35 and 40 $\mu m^2$ at 1550 nm.

In preferred embodiments, the first optical fiber portion 10' has positive dispersion at 1550 nm, and the second optical fiber portion 12' has negative dispersion at 1550 nm. In other preferred embodiments, the first optical fiber portion has positive dispersion and positive dispersion slope at 1550 nm, and the second optical fiber portion has negative dispersion and negative dispersion slope at 1550 nm. In still other preferred embodiments, the first optical fiber portion 10' has positive dispersion between 1530 and 1570 nm, and the second optical fiber portion 12' has negative dispersion between 1530 and 1570 nm. In yet other preferred embodiments, the first optical fiber portion has positive dispersion and positive dispersion slope between 1530 and 1570 nm, and the second optical fiber portion has negative dispersion and negative dispersion slope between 1530 and 1570 mm.

In preferred embodiments, the second optical fiber portion 12' comprises a core 24 comprising at least three segments. Preferably, the core 24 comprises a central core segment, wherein the central core segment is surrounded by and in direct contact with a first annular segment, wherein the first annular segment is surrounded by and in direct contact with a second annular segment, wherein the central segment has a maximum relative refractive index $\Delta_1$, the first annular segment has a minimum relative refractive index $\Delta_2$, and the second annular segment has a maximum relative refractive index $\alpha_3$, and wherein $\Delta_1 > \Delta_3 > \Delta_2$. Preferably, $\Delta_1 > \Delta_3 > 0$. Preferably, the core is surrounded by a cladding 26 having a relative refractive index $\Delta_{CLAD}(r)=0$ throughout the cladding. In preferred embodiments, the cladding 26 extends from the core 24 to an outer diameter D2 of about 125 $\mu m$.

In preferred embodiments, the first optical fiber portion 10' comprises germania, and the second optical fiber portion 12' comprises germania and fluorine.

Preferably the length of exposed fiber with coating removed for splicing and beat treating has a longitudinal length less than 30 mm, more preferably less than 20 mm, even more preferably less than 15 mm.

Preferably, the first optical fiber portion 10' and the second optical fiber portion 12' have respective outermost claddings 20, 26 (i.e. the outermost silica-based portion, not including any coatings) with substantially similar outermost diameters, particularly proximate the respective ends which are spliced together. More preferably, the first optical fiber portion 10', the second optical fiber portion 12', and the splice region 31 have respective substantially similar outermost diameters. Preferably, the first optical fiber portion 10', the second optical fiber portion 12', and the splice region 31 have outermost diameters of between 120 and 130 $\mu m$, and even more preferably about 125 $\mu m$.

Also disclosed herein is a method of making an optical fiber transmission line 100 such that the loss due to the spliced connection is reduced during the fabrication of the optical transmission line. The method comprises the steps of: (a) fusing a first optical fiber 10 to a second optical fiber 12 to form the optical fiber transmission line 100 comprising first and second optical fiber portions joined 10', 12' at a fusion splice 30; (b) heating the optical fiber transmission line 100 after step (a) with a flame 32 directed at the fusion splice 30 sufficient to grow the mode field of the first optical fiber portion 10' and the second optical fiber portion 12' at or near the fusion splice 30, wherein both the first and second optical fiber portions 10', 12' are heated substantially symmetrically about the fusion splice 30; and (c) offset heating the optical fiber transmission line 100 after step (b) with a flame 32 directed asymmetrically about the fusion splice 30, wherein the offset heating is sufficient to provide a splice loss less than 0.15 dB for all wavelengths between 1530 and 1570 nm.

Preferably the flame 32 in step (c) is centered on an offset position C2 located on the second optical fiber portion 12', and longitudinally displaced from the fusion splice 30. Preferably, the second optical fiber portion is heated in step (c). More preferably, the flame contacts the second optical fiber portion heated in step (c).

In a preferred embodiment, both the first optical fiber portion 10' and the second optical fiber portion 12' are heated in step (c), and the second optical fiber portion is heated preferentially to the first optical fiber portion in step (c). Preferably, the flame 32 contacts the second optical fiber portion in step (c), and more preferably the flame contacts both the first optical fiber portion and the second optical fiber portion in step (c).

Preferably the method further comprises, prior to step (a), directly abutting an end 14 of the first optical fiber 10 directly to an end 16 of the second optical fiber 12, wherein the respective ends of the first and second optical fibers are fused, whereby the fusion splice is disposed at the juncture between the respective ends of the first and second optical fiber portions.

Also disclosed herein is a method of making an optical fiber transmission line, the method comprising: (a) directly abutting an end of a first optical fiber portion directly to an end of a second optical fiber portion and fusing the ends, thereby forming the optical transmission line with a fusion splice at the juncture between the respective ends of the first and second optical fiber portions; (b) heating the optical fiber transmission line with a flame centered at a first center-position on the optical fiber transmission line, wherein at least part of the flame contacts the fusion splice; and (c) heating the optical fiber transmission line with a flame centered at a second center-position on the optical fiber transmission line, the second center-position being longitudinally offset from the first center-position.

Also disclosed herein is a method for making an optical fiber transmission line, the method comprising: (a) directly abutting an end of a first optical fiber portion directly to an end of a second optical fiber portion and fusing the ends to form the optical transmission line with a fusion splice at the juncture between the respective ends of the first and second optical fiber portions; (b) heating the optical fiber transmission line with a flame centered at a first center-position on the optical fiber transmission line; and (c) heating the optical fiber transmission line with a flame centered at a second center-position on the optical fiber transmission line, wherein the second center-position is longitudinally offset from the first center-position. Preferably, the line is heated until the splice loss is less than 0.15 dB at 1550 nm.

In a preferred embodiment, the first center position is located at the fusion splice, whereby the flame is centered on the fusion splice.

Preferably, the second center position is longitudinally offset from the first center position by greater than 1 mm, more preferably by greater than or equal to 1.5 mm, even more preferably by greater than or equal to 2 mm, and still more preferably by between 2 and 3 mm. In a preferred embodiment, the second center position is longitudinally offset from the first center position by about 2.5 mm.

Preferably, the flame used in step (c) is the same flame used in step (b), and the position of at least one of the flame and the line are moved relative to the other. Different flames may be used in steps (b) and (c).

Preferably, at least part of the flame contacts the fusion splice in step (c).

Also disclosed herein is a method for forming an optical fiber, the method comprising: providing a first optical fiber comprising an end having a first MFD; providing a second optical fiber comprising an end having a second MFD, wherein the second MFD is less than the first MFD; fusion splicing the respective ends of the first optical fiber and the second optical fiber at a fusion splice joint to form a unitary optical fiber comprising a first optical fiber portion formed from the first optical fiber and a second optical fiber portion formed from the second optical fiber; then, after the fusion splicing, flame heating the unitary optical fiber at the splice joint with a flame disposed symmetrically about the fusion splice joint; and, then, flame heating the unitary optical fiber with a flame disposed asymmetrically about the fusion splice joint and toward the second optical fiber portion.

In one preferred embodiment, the first optical fiber further comprises at least one section having a MFD dissimilar from the first MFD.

In one preferred embodiment, wherein the second optical fiber further comprises at least one section having a MFD dissimilar from the second MFD.

Also disclosed herein is a method for making an optical fiber transmission line, the method comprising: (a) directly abutting an end of a first optical fiber portion directly to an end of a second optical fiber portion and fusing the ends to form the optical transmission line with a fusion splice at the juncture between the respective ends of the first and second optical fiber portions; (b) heating the fusion splice with a flame; and (c) heating with a flame one of the first and second optical fiber portions at a position longitudinally spaced away from the fusion splice by an offset distance.

Preferably, the fusion splice is heated for less than 15 minutes in step (b). More preferably, the fusion splice is heated for between 5 minutes and 15 minutes in step (b).

Preferably, wherein the fusion splice is heated for less than 10 minutes in step (c). More preferably, the fusion splice is heated for less than 5 minutes in step (c).

In a preferred embodiment, one of the first optical fiber portion and the second optical fiber portion comprises a first dopant and a second dopant, wherein the fusion splice is heated to a temperature in steps (b) and (c) sufficient to diffuse the first dopant and the second dopant at similar diffusion rates.

Preferably, two points along the optical transmission line are maintained stationary, wherein the two points straddle the fusion splice, and wherein the optical transmission line is suspended between the two points and held substantially straight during steps (b) and (c). In a preferred embodiment, a point on the first optical fiber portion is fixed and a point on the second optical fiber portion is fixed, such that a part of the optical transmission line containing the fusion splice is held straight during steps (b) and (c).

Preferably, the flame heating in steps (b) and (c) is produced by supplying a flammable gas that reacts with oxygen in the surrounding air to form a flame. Preferably, the flammable gas is hydrogen. The flammable gas is supplied to a burner having an exit with an effective diameter of preferably between 5 and 13 mm, more preferably between 8 and 12 mm, even more preferably between 9 and 11 mm, wherein the flame emanates from the exit of the burner. Preferably, the burner has a generally circular exit opening. Preferably, the flame in steps (b) and (c) is directed downwardly toward the optical transmission line. Preferably, the flammable gas is supplied to the burner at between 0.15 and 0.35 slpm (standard liters per minute), more preferably between 0.2 and 0.3 slpm, and even more preferably between 0.25 and 0.3 slpm. Preferably, the exit opening of the burner is spaced away from the optical transmission line by a distance of about 3 to 5 mm.

The second optical fiber portion preferably comprises first and second dopants, and the heating in steps (b) and (c) is sufficient to diffuse the first and second dopants in the second optical fiber portion, but not enough to cause the optical transmission line proximate the fusion splice to sag during steps (b) and (c).

In preferred embodiments, the first optical fiber portion is doped with germania, the second optical fiber portion is doped with germania and fluorine, and the heating in steps (b) and (c) is sufficient to cause the germania and the fluorine in the second optical fiber portion to diffuse at approximately similar diffusion rates, but not enough to cause the optical transmission line proximate the fusion splice to sag.

Preferably, the optical transmission line is heated in steps (b) and (c) to a temperature less than 2200° C., more preferably between 1600 and 2200° C., even more preferably between 1700 and 2000° C.

Preferably, the optical transmission line is heated in step (b) wherein at least two dopants in the second optical fiber portion diffuses substantially isokinetically.

Preferably the optical fiber transmission line described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm.

Preferably, the core of the first optical fiber portion is comprised of silica doped with germanium, i.e. germania doped silica.

In preferred embodiments, the refractive index profile of the first optical fiber portion is non-negative from the centerline to the outer radius of the core, $r_{CORE}$. In preferred embodiments, the optical fiber contains no index-decreasing dopants in the core.

In preferred embodiments, the refractive index profile of the second optical fiber portion comprises at least one non-negative segment and at least one negative segment. In preferred embodiments, the refractive index profile of the second optical fiber portion comprises a positive central segment, a negative annular segment surrounding the central segment, and a positive annular segment surrounding the negative annular segment.

Preferably, the high purity silica-based fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

EXAMPLE

Figure 6:
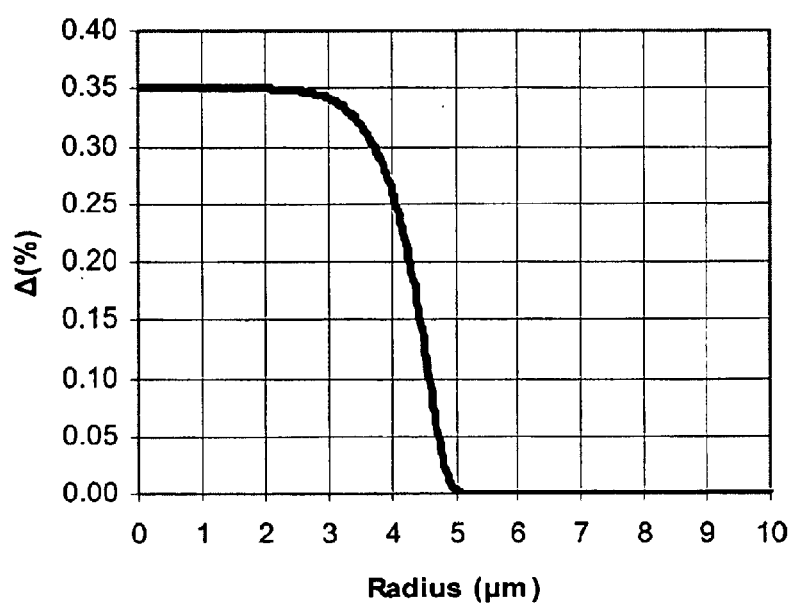
FIG. 6 schematically illustrates the relative refractive index profile of an exemplary first optical fiber.
Figure 7:
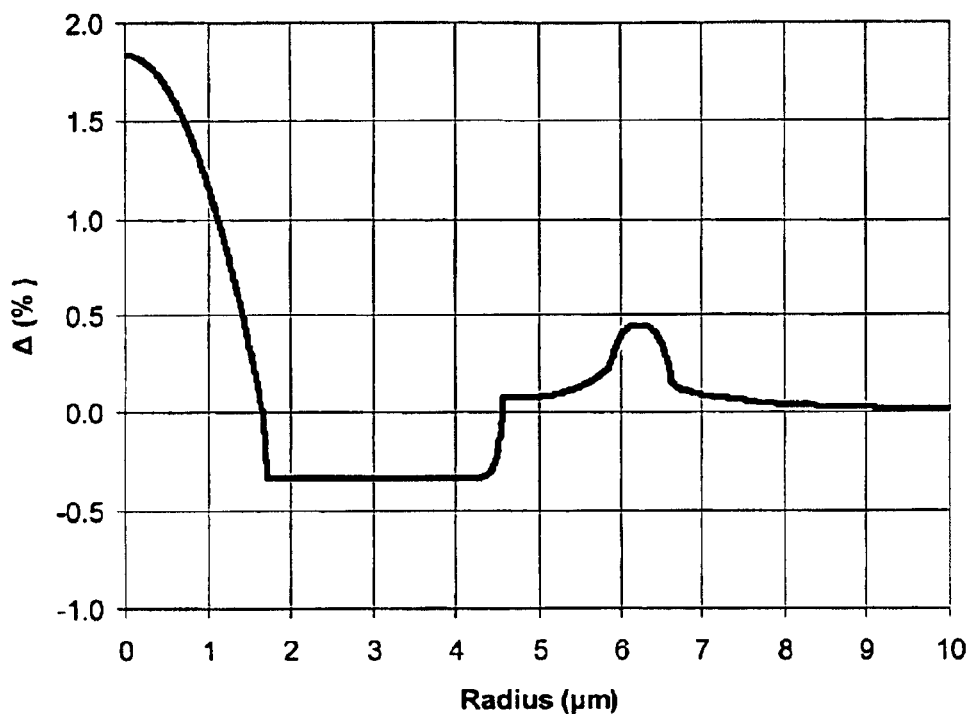
FIG. 7 schematically illustrates the relative refractive index profile of an exemplary second optical fiber.

A first optical fiber having a relative refractive index profile shown schematically in FIG. 6 and a second optical fiber having a relative refractive index profile shown schematically in FIG. 7 were joined together using a conventional core alignment splicer and methodology. The core 18 of the first optical fiber 10 has a positive relative refractive index profile 200 surrounded by cladding 20. The core 24 of the second optical fiber 12 has a positive relative refractive index profile central core segment 210 surrounded by a negative relative refractive index profile annular segment, or "moat", 212 surrounded by a positive relative refractive index profile second annular segment, or "ring", 214 surrounded by cladding 26. The first optical fiber had a mode field diameter of 10 $\mu$m and an effective area of 83 $\mu$M at a wavelength of 1550 nm, and the second optical fiber had a mode field diameter of 5 $\mu$m and an effective area of 18 $\mu m^2$ at a wavelength of 1550 nm. The first and second fibers were each stripped of their coating 16 mm from their respective ends. The splice was made with a Fujikura 30S splicer operated at 40 bits are power for 700 msec with the splicer in core alignment mode. The splice was moved to a post splice heat treatment station that comprised a hydrogen burner and an X-Y-Z stage with fiber clip holders to position the spliced fibers relative to the hydrogen flame. The hydrogen burner was a quartz tube with a 10 mm diameter. A quartz tube burner was used instead of a ceramic burner to minimize particulate contamination of the fiber for improved fiber tensile strength. The hydrogen flow was monitored via a mass flow controller positioned between a rotameter and the quartz burner tube. Hydrogen flow rate was 0.275 standard liters per minute (SLPM). Accurate positioning of the fiber to the flame was achieved by micrometer adjustments of the X-Y-Z fiber holder stage. The stage was mounted on a slide to allow the fiber to be removed from the flame, for example to permit room temperature power measurements and fiber loading/unloading. The flow rate and the tip velocity were selected to prevent movement of the spliced fiber exposed to the burner.

The burner was used to heat the fusion spliced region for 7 minutes followed by moving the flame 2.5 mm relative to the fiber to preferentially heat the second optical fiber portion side of the splice for an additional 3 minutes. The edge of the tip of the burner was maintained at a distance of about 3.5 mm from the fiber and the visible edge of the flame tangentially touched the fiber, wherein the flame length was about 3.5 mm. As determined by MFD measurements, a more gradual taper along the length of the splice region on the side of the second optical fiber portion was formed. A splice loss at 1550 nm of 0.05 dB was achieved.

Similar fibers were joined by the method disclosed herein, resulting in splice losses at 1550 nm of less than 0.05 dB, and even less than 0.03 dB. The method disclosed herein resulted in optical fiber transmission lines having splice loss at 1550 nm less than 0.05 dB and substantially flat wavelength dependent loss of less than 0.02 dB across the C-band.

Figure 8:
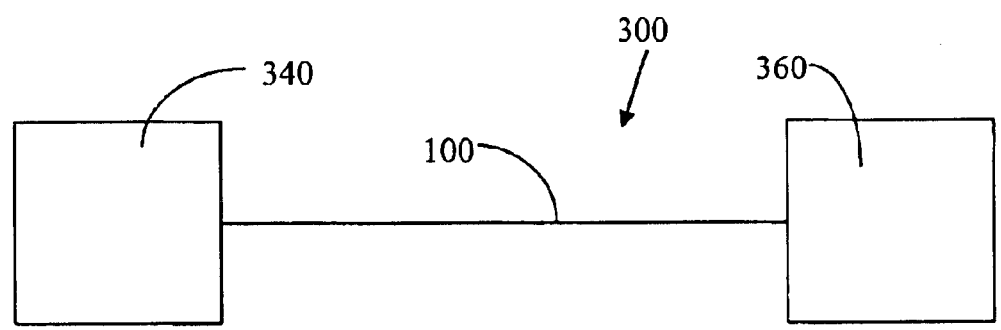
FIG. 8 schematically illustrates an optical fiber communication system as disclosed herein.

As shown in FIG. 8, an optical fiber transmission line 100 as disclosed herein is implemented in an optical fiber communication system 300. System 300 includes a transmitter 340 and a receiver 360, wherein the optical fiber transmission line 100 optically connects transmitter 340 and receiver 360 and allows transmission of optical signals therebetween. System 300 is preferably capable of 2-way communication, and transmitter 340 and receiver 360 are shown for illustration only. The system 300 may also include one or more optical devices optically connected to one or more sections or spans of optical fiber as disclosed herein, such as one or more regenerators, amplifiers (such as a Raman amplifier), or dispersion compensating modules. In at least one embodiment, an optical fiber communication system according to the present invention comprises a transmitter and receiver connected by the optical fiber transmission line without the presence of a regenerator therebetween. In another embodiment, an optical fiber communication system according to the present invention comprises a transmitter and receiver connected by the optical fiber transmission line without the presence of an amplifier therebetween. In yet another embodiment, an optical fiber communication system according to the present invention comprises a transmitter and receiver connected by the optical fiber having neither an amplifier nor a regenerator nor a repeater therebetween.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band. In preferred embodiments, the system is adapted to transmit signals in the C-band and L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber transmission line as disclosed herein optically connected to the optical source, and a receiver optically connected to the optical fiber for receiving the optical signals transmitted through the optical fiber transmission line, the optical source having the capability of dithering, and/or phase modulating, and/or amplitude modulating, the optical signal generated by the optical source, and the optical signal is received by the receiver.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber transmission line comprising:

a first optical fiber portion fused directly to a second optical fiber portion at a splice region, the first optical fiber portion having a first MFD at 1550 nm and the second optical fiber portion having a second MFD at 1550 nm, the first MFD differing from the second MFD, wherein the splice region has a splice loss less than 0.15 dB for all wavelengths between 1530 and 1570 nm.

2. The optical fiber transmission line of claim 1 wherein the splice loss is less than 0.15 dB for all wavelengths between 1520 and 1590 nm.

3. The optical fiber transmission line of claim 1 wherein the splice loss is less than 0.15 dB for all wavelengths between 1470 and 1620 nm.

4. The optical fiber transmission line of claim 1 wherein the splice loss varies by less than 0.05 dB for all wavelengths between 1530 and 1570 nm.

5. The optical fiber transmission line of claim 1 wherein the splice region has a splice loss which varies by less than 0.02 dB between 1530 and 1570 nm.

6. The optical fiber transmission line of claim 1 wherein the splice region has a splice loss less than 0.10 dB for all wavelengths between 1530 and 1570 nm.

7. The optical fiber transmission line of claim 1 wherein the splice region has a splice loss less than 0.07 dB for all wavelengths between 1530 and 1570 nm.

8. The optical fiber transmission line of claim 1 wherein the first MFD is greater than 8 $\mu$m at 1550 nm and the second MFD is less than 8 $\mu$m at 1550 nm.

9. The optical fiber transmission line of claim 1 wherein the first MFD differs from the second MFD by more than 2 $\mu$m at 1550 nm.

10. The optical fiber transmission line of claim 1 wherein the first optical fiber portion and the second optical fiber portion have respective outermost claddings with substantially similar outermost diameters.

11. The optical fiber transmission line of claim 1 wherein the first optical fiber portion has an effective area at 1550 run greater than 80 $\mu$m$^2$ and the second optical fiber portion has an effective area at 1550 nm less than 40 $\mu$m$^2$.

12. The optical fiber transmission line of claim 1 wherein the first optical fiber portion has a core with an entirely non-negative relative refractive index profile and the second optical fiber portion has two nonadjacent positive relative refractive index segments and a negative relative refractive index segment disposed between the two nonadjacent segments.

13. The optical fiber transmission line of claim 1 wherein the first optical fiber portion has a positive dispersion at 1550 nm and the second optical fiber portion has a negative dispersion at 1550 mm.

14. The optical fiber transmission line of claim 13 wherein the first optical fiber portion has a dispersion at 1550 nm greater than 10 ps/nm-km and the second optical fiber portion has a dispersion at 1550 nm less than –10 ps/nm-km.

15. An optical fiber communication system comprising a transmitter, a receiver, and the optical transmission line of claim 1 optically connecting the transmitter and the receiver, wherein optical signals having at least one wavelength in a wavelength range from 1530 to 1570 nm are carried by the optical transmission line.

16. A method of making an optical fiber transmission line, the method comprising:

(a) fusing a first optical fiber to a second optical fiber to form the optical fiber transmission line comprising first and second optical fiber portions joined at a fusion splice;

(b) heating the optical fiber transmission line after step (a) with a flame directed at the fusion splice sufficient to grow the mode field of the first optical fiber portion and the second optical fiber portion at or near the fusion splice, wherein both the first and second optical fiber portions are heated substantially symmetrically about the fusion splice; and (c) offset heating the optical fiber transmission line after step (b) with a flame directed asymmetrically about the fusion splice sufficient to provide a splice loss less than 0.15 dB for all wavelengths between 1530 and 1570 nm.

17. The optical fiber transmission line of claim 16 further comprising, prior to step (a), directly abutting an end of the first optical fiber directly to an end of the second optical fiber, wherein the respective ends of the first and second optical fibers are fused, whereby the fusion splice is disposed at the juncture between the respective ends of the first and second optical fiber portions.

18. A method for reducing splice loss in making an optical fiber transmission line, comprising:

(a) directly abutting an end of a first optical fiber portion directly to an end of a second optical fiber portion and fusing the ends to form the optical transmission line with a fusion splice;

(b) heating the optical fiber transmission line with a flame centered at a first center-position on the optical fiber transmission line; and (c) heating the optical fiber transmission line with a flame centered at a second center-position on the optical fiber transmission line, wherein the second center-position is longitudinally offset from the first center-position.

19. The optical fiber transmission line of claim 18 wherein the line is heated until the splice loss is less than 0.15 dB at 1550 nm.

* * * * *